United States Patent [19]
Lenihan et al.

[11] Patent Number: 6,120,345
[45] Date of Patent: Sep. 19, 2000

[54] RIDE-ON VEHICLE WITH A FREE-FLOATING WHEEL

[75] Inventors: Gary G. Lenihan; John L. Jones, Jr.; Karl D. Lerch, all of East Aurora, N.Y.

[73] Assignee: Mattel, Inc., El Segundo, Calif.

[21] Appl. No.: 09/245,579

[22] Filed: Feb. 5, 1999

[51] Int. Cl.$^7$ ..................................................... A63H 17/00
[52] U.S. Cl. ............................................ 446/431; 472/135
[58] Field of Search ............................ 472/130, 131, 472/135; 496/7, 29, 431, 440, 462

[56] References Cited

U.S. PATENT DOCUMENTS

| | | | |
|---|---|---|---|
| 1,571,489 | 2/1926 | Morihata | 446/431 |
| 3,917,270 | 11/1975 | Gothard, Jr. et al. | 446/440 |
| 4,399,883 | 8/1983 | Todokoro | 446/431 |
| 4,494,763 | 1/1985 | Whitehead | 446/431 |
| 5,533,899 | 7/1996 | Young | 472/135 |

*Primary Examiner*—Sam Rimell
*Attorney, Agent, or Firm*—Kolisch, Hartwell, Dickinson, McCormack & Heuser

[57] ABSTRACT

A children's ride-on vehicle with a free-floating wheel is disclosed. The ride-on includes a drive assembly with a battery-powered motor, and a frame that is adapted to support a child and resemble a full-size motorcycle. The ride-on further includes a steerable wheel, plural driven wheels and a free-floating wheel, which is unbiased and travels within a defined range of positions with respect to the ride-on's frame as external forces are imparted to the wheel.

26 Claims, 4 Drawing Sheets

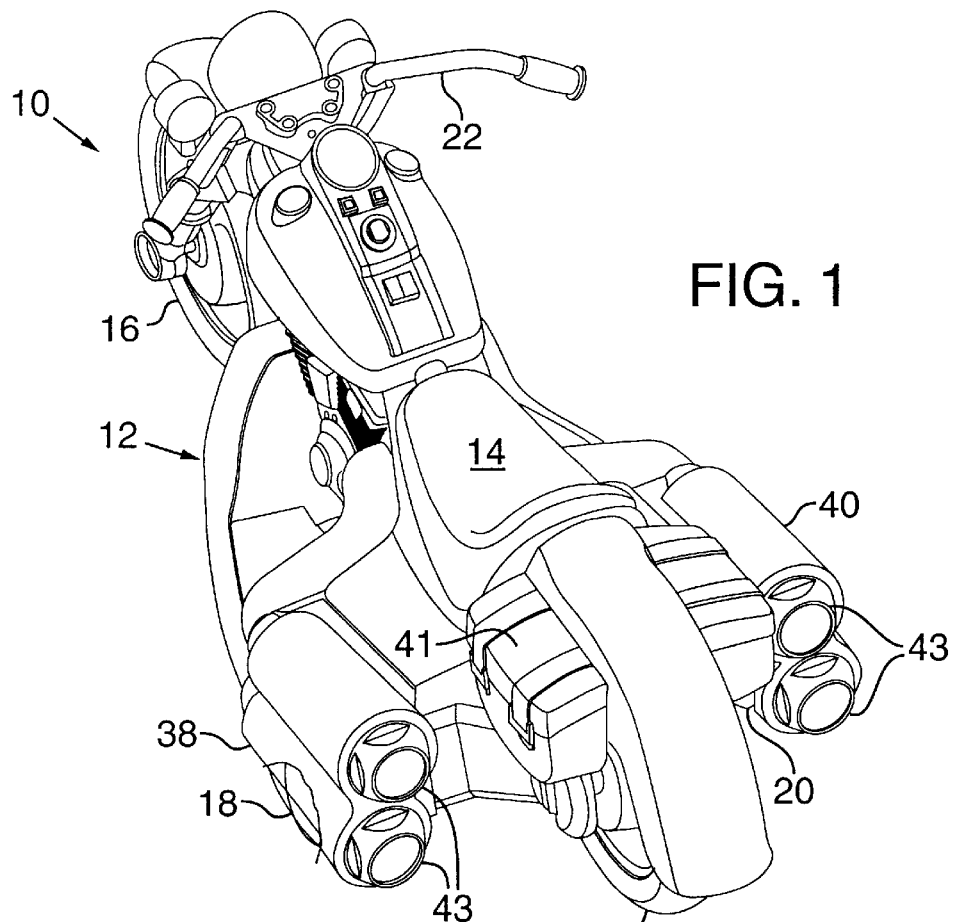
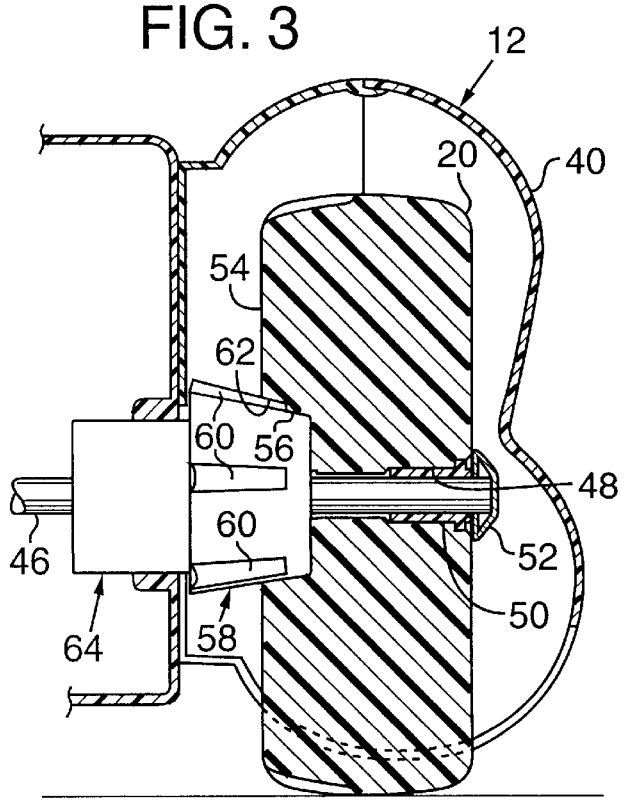
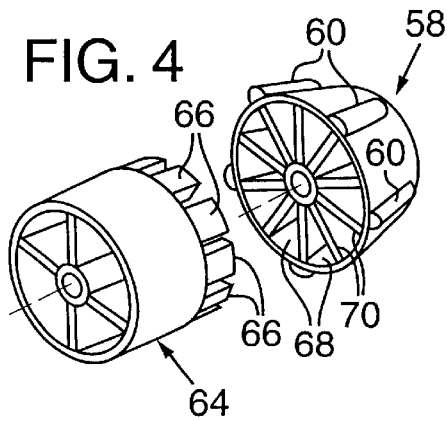

RIDE-ON VEHICLE WITH A FREE-FLOATING WHEEL

FIELD OF THE INVENTION

The invention relates generally to children's ride-on vehicles, and more particularly to a children's ride-on vehicle with a free-floating wheel.

BACKGROUND AND SUMMARY OF THE INVENTION

Ride-on vehicles for children have become increasingly popular due in part to the desire of children to drive self-propelled vehicles resembling full-size vehicles. Such ride-on vehicles, or ride-ons, are typically propelled by battery-powered motors and generally include scaled-down features of full-size vehicles.

One challenge in designing reduced-scale vehicles is to make the vehicle resemble a full-size vehicle as closely as possible, while still providing a vehicle that is safe for use by children. When a ride-on is designed to resemble a four-wheeled vehicle, such as a car or truck, the corresponding ride-on tends to also have four wheels. When a ride-on is designed to resemble a motorcycle, however, a balance must be reached between safety and the accuracy of the reproduction. Certainly the most accurate reproduction is for the ride-on to only have two wheels. However, children may not have the size, strength or coordination to balance a two wheeled ride-on, especially when propelled by the ride-on's motor. Adding additional wheels to the ride-on detracts from the accuracy of the reproduction, and thus may reduce the child's desire for the ride-on. Therefore, there is a desire to produce a ride-on that resembles a motorcycle, yet still has the stability provided by a ride-on having at least three points of support.

The invented ride-on includes a drive assembly with a battery-powered motor, and a frame that is adapted to support a child and resemble a full-size motorcycle. The ride-on further includes a forward wheel, plural driven wheels and a rear free-floating wheel, which is unbiased and travels within a defined range of positions with respect to the ride-on's frame as external forces are imparted to the wheel.

BRIEF DESCRIPTION OF THE DRAWINGS

FIG. 1 is an isometric view of a children's ride-on constructed according to the present invention, with a portion of the ride-on's frame broken away to expose a drive wheel.

FIG. 3 is a cross-sectional view of one of the drive wheels shown in FIG. 1.

FIG. 4 is an exploded isometric view of the wheel bearing and gear shown in FIG. 3.

DETAILED DESCRIPTION OF THE PREFERRED EMBODIMENTS AND BEST MODE OF THE INVENTION

Figure 2:
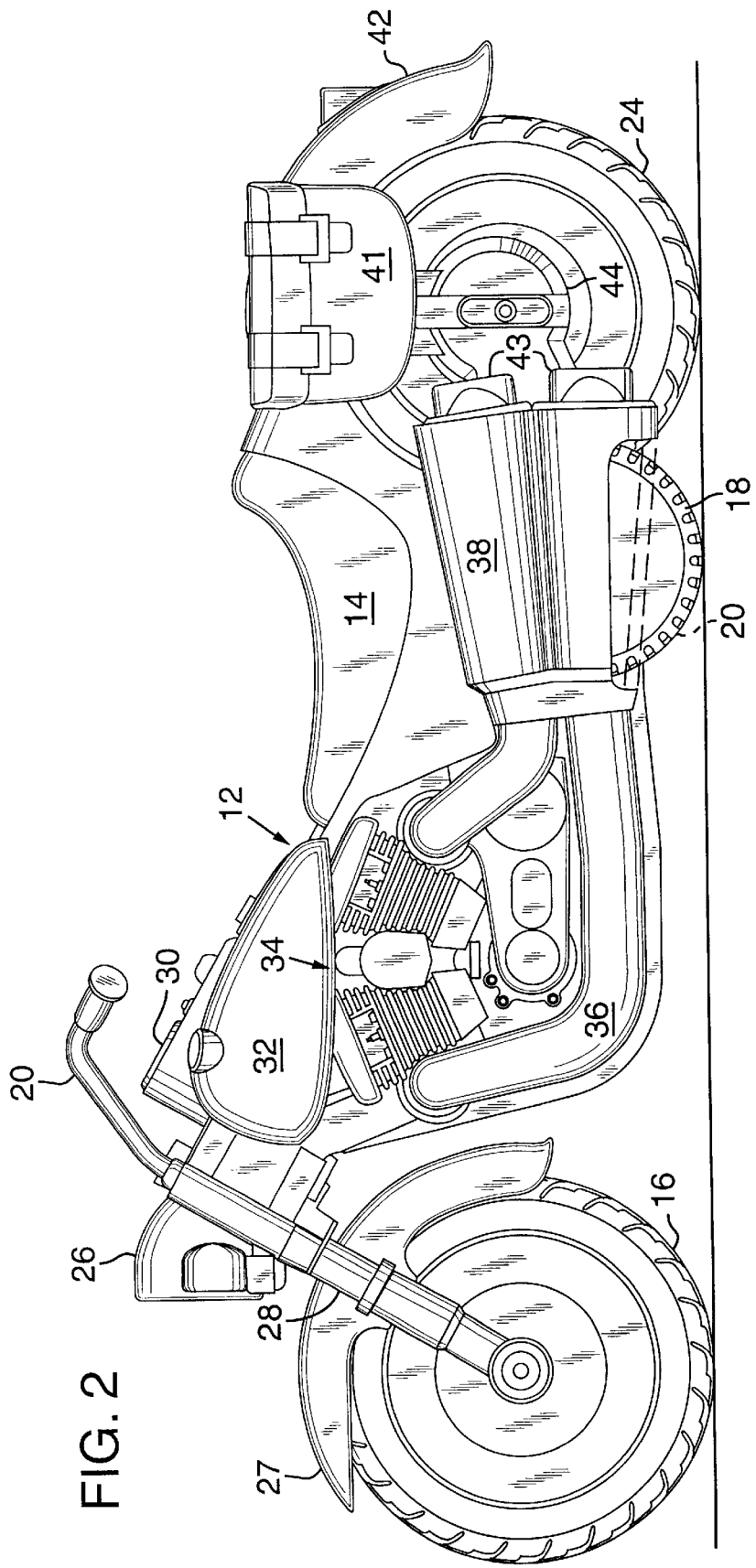
FIG. 2 is a side elevation view of the ride-on of FIG. 1.

A children's ride-on constructed according to the present invention is shown in FIG. 1 and generally indicated at 10. Ride-on 10 includes a frame, or vehicle body, 12 with a seat 14, a forward wheel 16, drive wheels 18 and 20, a steering mechanism 22, and a rear wheel 24.

As shown, ride-on 10 generally resembles a reduced-scale motorcycle, and more particularly a reduced-scale Harley-Davidson® motorcycle. It should be understood that ride-on 10 may be shaped to resemble other motorcycles and two-wheeled vehicles. Frame 12 typically is formed from molded plastic parts that are secured together by screws or other suitable fasteners. As shown in FIG. 2, frame 12 is shaped to resemble components of a conventional motorcycle, including a head light 26, front fender and struts 27 and 28, dash board 30, gas tank 32, engine 34, foot boards 36, exhaust pipes 38 and 40 (shown in FIG. 1), saddle bag 41, rear fender 42, tail lights 43 and swing arms 44 and 45 (shown in FIG. 5). Frame 12 also houses the vehicle's electrically powered motor assembly, battery assembly, and electrical and mechanical interconnections (not shown). It should be understood that the motor and battery assemblies each may include one or more motors or batteries, respectively. It should be understood that the shape and configuration of the frame will vary depending on the particular model and style of motorcycle that ride-on 10 is designed to resemble.

In FIGS. 1 and 2, it can be seen that drive wheels 18 and 20 are substantially housed within the portions of frame 12 forming exhaust pipes 38 and 40. Because its drive (also referred to as driven) wheels are substantially hidden from view, ride-on 10 has the appearance of a two-wheeled motorcycle, even though it has at least three wheels supporting the frame in a stable operating position. In fact, in FIG. 1 it can be seen that a portion of the frame forming exhaust pipe 38 had to be broken away to reveal drive wheel 18. Similarly, drive wheel 20 is almost completely hidden from view by "exhaust pipe" 40. In FIG. 2, it can be seen that the lower portion of exhaust pipe 38 is removed to provide additional clearance for drive wheel 18. It is within the scope of the present invention that the exhaust pipes may have less of their lower portions removed, such as shown in dashed lines in FIG. 2.

Because ride-on vehicles are often used by young children who may not have the strength, size and/or coordination to balance a two-wheeled vehicle, ride-on 10 provides at least three spaced-apart supports that stabilize the ride-on. More specifically, front wheel 16 and drive wheels 18 and 20 form a tricycle. However, by hiding the drive wheels within the frame, ride-on 10 enables the child to feel and look like it is riding a two-wheeled motorcycle.

In FIG. 3, the interconnection between drive wheel 20 and the ride-on's motor assembly is shown. It should be understood that drive wheel 18 is coupled to the motor assembly with a similar set of interconnections. As shown, an axle 46 extends through wheel 20, which includes an outer recess 48 into which an axle bushing 50 is seated. Axle 46 passes through bushing 50, and wheel 20 is retained on the axle by a cap nut 52 or other suitable fastener. Wheel 20 includes an inner face 54 that includes a recess 56 within which a wheel bearing 58 is received. Bearing 58 is rotatably mounted on axle 46 and includes plural outer ribs 60 that extend radially outward from axle 46. Outer ribs 60 are received within corresponding channels 62 in recess 56. Once seated therein, wheel 20 rotates when bearing 58 is rotated about, or with, axle 46.

Wheel bearing 58 is rotated by a gear 64, which is driven by the ride-on's motor assembly (not shown) through any suitable mechanical interconnection, as is known in the art.

Gear 64 is seated on axle 46 and includes plural teeth 66 that extend into cavities 68 formed by internal ribs 70 within bearing 58. Closing an electrical circuit between the ride-on's battery assembly and its motor assembly imparts an angular velocity to gear 64, which in turn directs the rotation of bearing 58 and drive wheel 20 by the engagement of teeth 66 and internal ribs 70. Because bearing 58 is interlocked with drive wheel 20, the rotation of bearing 58 also causes wheel 20 to rotate, thereby propelling the ride-on in the selected direction.

The circuit described above typically is opened and closed by a switch, which is mounted on the frame in a position where it may be operated by the child. Examples of suitable switches are pedals on one of the ride-on's foot boards 36, a throttle switch on steering mechanism (i.e. handle bars) 22, or a switch on dash board 30. The ride-on's controls may include a reversing switch to enable the child to selectively change the direction of revolution of the above components, and thereby change the direction of travel of ride-on 10.

Unlike drive wheels 18 and 20, which are used to propel ride-on 10, or front wheel 16, which is oriented by steering mechanism 22 to steer the ride-on, rear wheel 24 just goes along for the ride. By this it is meant that wheel 24 is neither driven nor steerable. Instead, it is a free-spinning wheel which freely rotates and travels along a defined path as external forces are imparted upon it. By external forces, it is meant forces that originate from external ride-on 10 and which are imparted directly or indirectly to rear wheel 24. Examples of external forces are gravity and bumps or shocks causes by ride-on 10 traveling over uneven terrain. Wheel 24 may also be described as being free from internal vertical bias when within its defined range of positions because ride-on 10 does not include any spring, lever arm or other biasing mechanism to urge wheel 24 to a particular position. As such, wheel 24 is neither biased nor otherwise loaded to remain in a particular position or orientation with respect to the rest of ride-on 10. Wheel 24 may also be described as traveling or floating within a defined range of positions to adjust freely to changes in elevation in the surface over which ride-on 10 travels.

Figure 5:
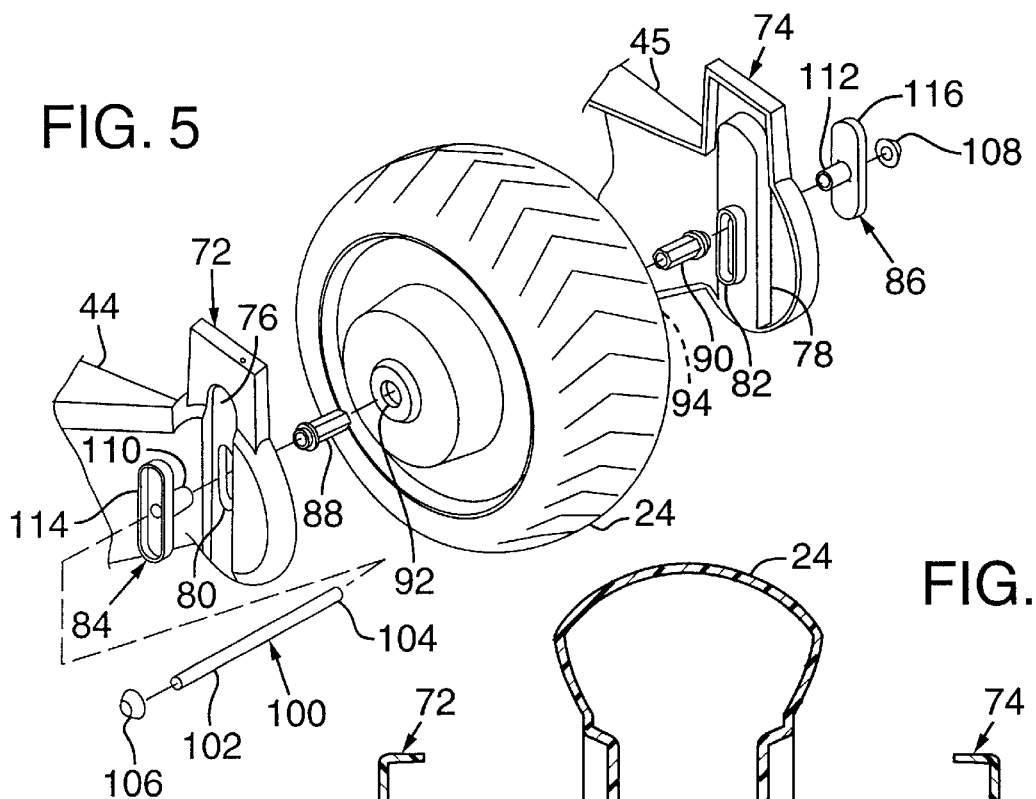
FIG. 5 is an exploded isometric view of the free-floating rear wheel shown in FIG. 4.
Figure 6:
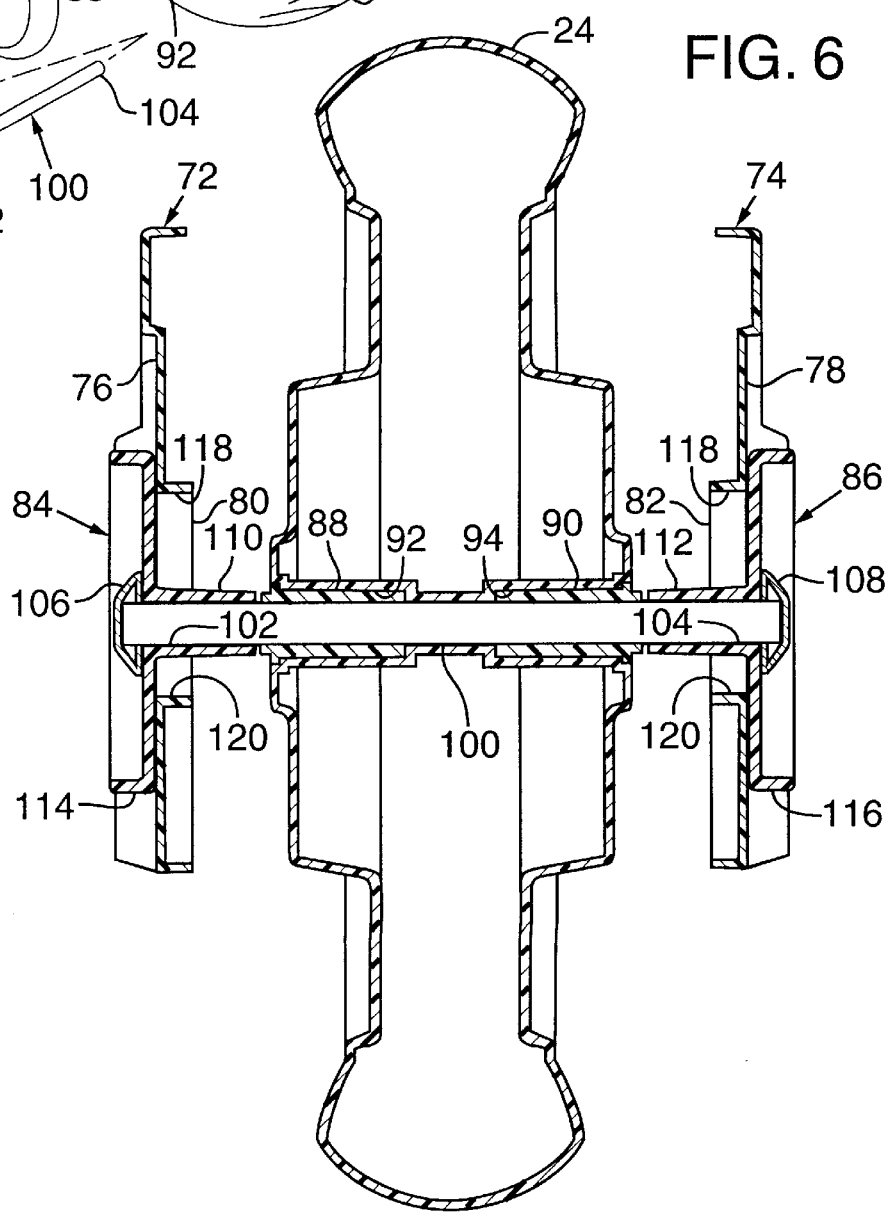
FIG. 6 is a cross-sectional view of the wheel of FIG. 5.

As shown in FIGS. 5 and 6, the portions of frame 12 which form the ride-on's "swing arms" 44 and 45 are in fact spaced-apart mounts 72 and 74 between which wheel 24 is rotatably mounted. Mounts 72 and 74 are fixed in place relative to the rest of frame 12, and includes regions 76 and 78 that form a track with vertical channels 80 and 82. As discussed subsequently, channels 80 and 82 cooperate with axle bearings 84 and 86 to define a race or vertical range through which wheel 24 may travel as external forces are applied to the wheel.

As perhaps best seen in FIG. 5, wheel 24 includes a pair of bushings 88 and 90 that are inserted into a corresponding pair of receptacles 92 and 94, one on each side of wheel 24. As shown, the portions of bushings 88 and 90 which are inserted within the receptacles are generally hex-shaped. Receptacles 92 and 94 have a similar shape, thereby enabling wheel 24 to rotate as bushings 88 and 90 rotate. It should be understood that configurations other than the hex-shaped configuration shown in FIG. 5 may be used.

An axle 100 passes through wheel 24 and bushings 88 and 90 to provide an axis about which wheel 24 may rotate. Axle 100 includes a pair of ends 102 and 104, which each are passed through a respective one of channels 80 and 82 and axle bearings 84 and 86. A pair of cap nuts or other suitable fasteners 106 and 108 are mounted on the ends of axle 100. Fasteners 106 and 108 secure the axle bearings, mounts, and wheel together with only a small amount of side-to-side play, while still allowing bushings 88 and 90, and thus wheel 24, to rotate on the axle.

As discussed, channels 80 and 82 define a vertical range of positions within which axle bearings 84 and 86 are free to travel. As shown, channels 80 and 82 each have an oval, or racetrack-shaped opening, through which a stem portion 110 and 112 of one of the axle bearings extends. While the stem portions extend through the bearings, the head portions 114 and 116 of each axle bearing slide up and down the track defined by regions 76 and 78. Movement of axle bearings 84 and 86 up and down in response to uneven terrain is limited by top 118 and bottom 120 limits of channels 80 and 82, which are indicated in FIG. 6.

From a nominal position on level terrain, wheel 24 can move up approximately 0.4 inches and down approximately one inch. By varying the length of the channels or size of the axle bearings, it is possible to define a range of positions which is larger or smaller than this range. For most ride-ons, it is expected that a range of between approximately one inch and approximately three inches will be sufficient. It should be understood, however, that the most suitable range of positions will tend to vary depending upon such factors as the size of the ride-on, the surface upon which it is intended for use, and the distance between the ride-on's drive wheels and free-floating wheel. Therefore ranges outside of those recited above are possible and within the scope of the present invention.

Figure 7:
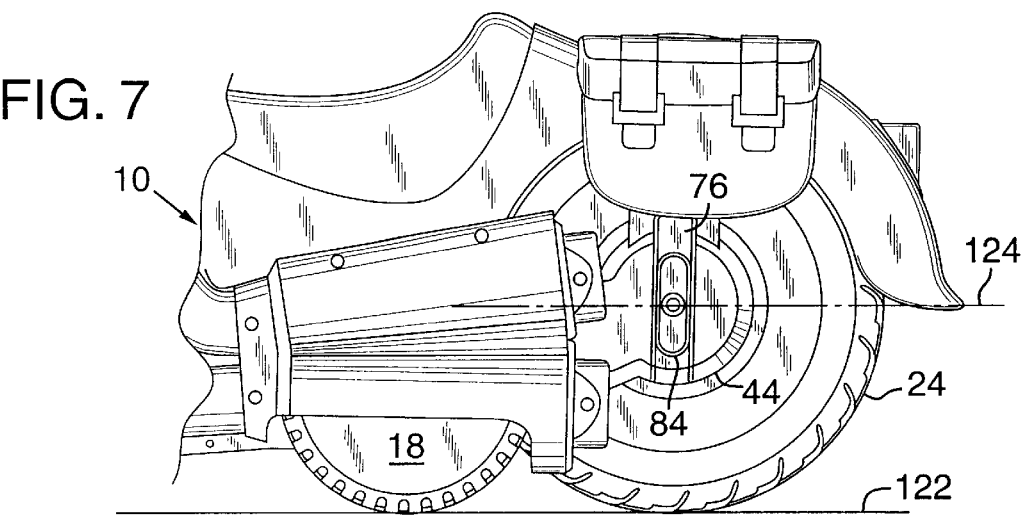
FIG. 7 is a fragmentary side elevation view of the rear portion of the ride-on of FIG. 4 on a straight surface.

In FIG. 7, ride-on 10 is shown traveling over a straight surface 122. By this it is meant that the surface on which ride-on 10 travels is planar. As shown, surface 122 is level, however it could also be inclined at an angle. In FIG. 7 it can be seen that each of the ride-on's wheels are in contact with surface 122. The position of rear wheel 24 shown in FIG. 7 will be referred to herein as a neutral or intermediate position, since wheel 24 can travel upward and downward from this position, as discussed below. In FIG. 7, the position of axle 100 is generally indicated with a line 124 extending generally parallel to surface 122. Because wheel 24 is mounted to frame 12 so that it may freely spin and travel up and down as external forces are imparted to the wheel, the frictional contact with surface 122 causes the wheel to rotate as ride-on 10 travels over surface 122. This causes wheel 24 to rotate in a direction and with a speed that corresponds with the speed and direction of ride-on 10. This also makes wheel 24 appear to be a driven wheel, although in reality it is a free-floating wheel.

Figure 8:
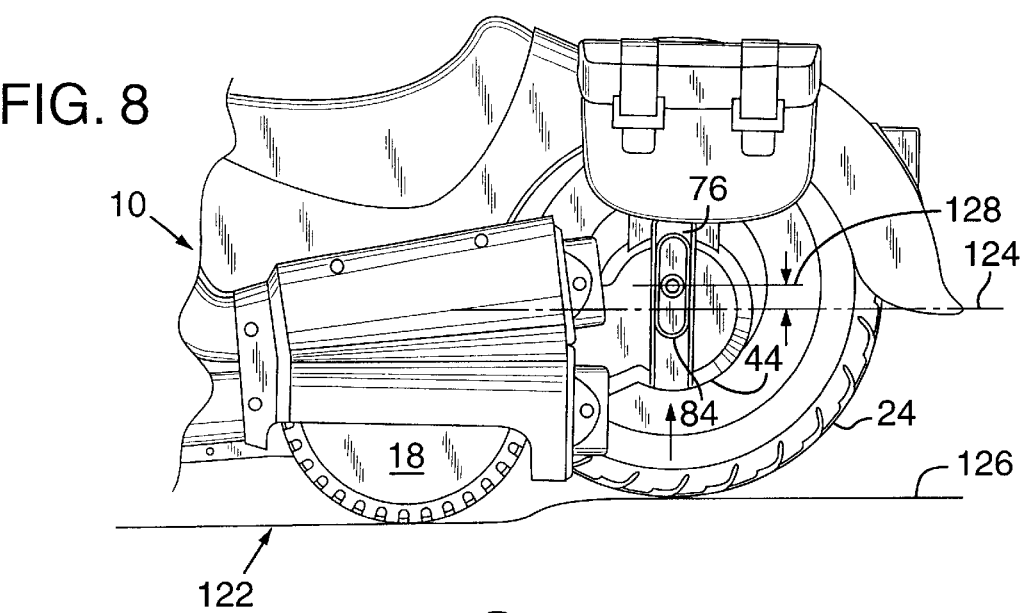
FIG. 8 is the side elevation view of FIG. 7, with the rear wheel raised from the position of FIG. 7 to accommodate travel over an uneven surface.

In FIG. 8, surface 122 is uneven. Specifically, the portion 126 of surface 122 over which wheel 24 is positioned is higher than the portions of the surface over which the ride-on's front and drive wheels 16, 18 and 20 are positioned. Because wheel 24 is not secured or biased to remain in its neutral position, the axle bearings have raised upwardly in their respective regions of the track, thereby also raising rear wheel 24 from its position shown in FIG. 7. For comparison with the position shown in FIG. 7, the position of axle 100 in this elevated position is generally indicated with line 128, and the extent to which wheel 24 has been raised can be seen by the distance between lines 124 and 128.

Because wheel 24 is a free-floating wheel and not a fixed wheel, it may deflect away from its current position when it encounters an external force, such as when ride-on 10 encounters the bump between the uneven portions of surface 122. This enables drive wheels 18 and 20 to remain in contact with surface 122. It should be understood by looking at FIG. 8 that if rear wheel 24 was not a free-floating wheel, the differences in elevation between front and rear wheels 16 and 24 would have resulted in drive wheels 18 and 20 being suspended above surface 122. Since these wheels are the ride-on's drive wheels, the vehicle would not be able to continue along its path until the user or other person freed the ride-on from its stuck position.

Figure 9:
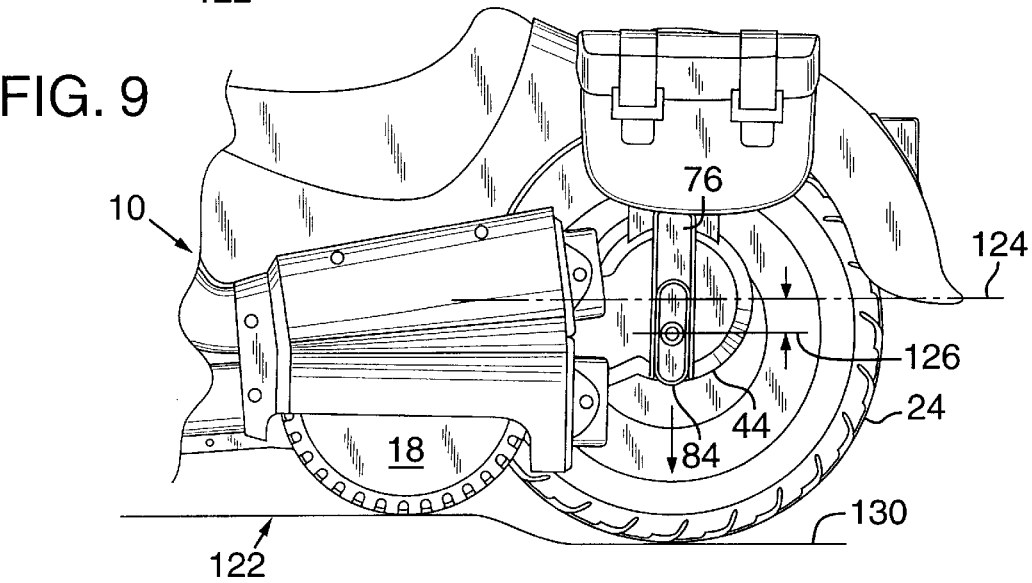
FIG. 9 is the side elevation view of FIG. 7, with the rear wheel lowered from the position of FIG. 7 to accommodate travel over another uneven surface.

On the other hand, if the portion of surface 122 is at a lower elevation than the corresponding portions of the surface over which the ride-on's front wheel travels, then the vehicle also could become stuck if wheel 24 was not a free-floating wheel. Alternatively, rear wheel 24 could be suspended above the surface. For example, in FIG. 9, surface 122 includes a depression 130 over which wheel 24 is positioned. Once suspended above this portion of the surface, the illusion of ride-on 10 being an actual two-wheeled motorcycle would be lost because the rear wheel would be elevated above the surface. However, by allowing rear wheel 24 to float within region 76 of the track, the wheel travels downward in the track to remain in contact with the surface. The position of axle 100 in FIG. 9 is indicated with a line 130, and the relative distance between this position and the position shown in FIG. 7 is shown between lines 126 and 130.

Besides the advantage of preventing the ride-on from becoming wedged or stuck in a position if the drive wheels lose contact with the surface over which the ride-on is traveling, free-floating rear wheel 24 also results in the ride-on looking more like an actual two-wheeled motorcycle because the wheel remains in contact with the ground surface at all times. This frictional contact with the surface causes the wheel to rotate about its axle, much like an actual non-driven wheel of a vehicle. Therefore, wheel 24 will spin in the direction of movement of ride-on 10 and will spin faster or slower as the speed of ride-on 10 is increased or decreased. Furthermore, because mounts 72 and 74 are configured to resemble the swing arm of an actual motorcycle, upward and downward movement of axle bearings 84 and 86 and wheel 24 as ride-on 10 travels over uneven terrain closely resembles the visual appearance of an actual motorcycle traveling over uneven terrain.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

We claim:

1. A children's ride-on vehicle, comprising:
   a frame;
   a first wheel rotatably mounted on the frame;
   a drive assembly;
   at least one driven wheel coupled to the drive assembly; and
   a free-floating wheel coupled to the frame and rotatable about an axle, wherein the frame includes a track within which the axle travels, and further wherein the track defines upper and lower limits within which the first wheel travels as external forces are imparted to the first wheel.

2. The vehicle of claim 1, wherein the free-floating wheel is slidably coupled to the frame and adapted to travel within a vertical range of positions as external forces are imparted to the wheel.

3. The vehicle of claim 2, wherein the free-floating wheel is free from internal bias within the vertical range of positions.

4. The vehicle of claim 1, wherein the free-floating wheel is rotatably mounted on an axle, wherein the track includes at least one aperture through which the axle extends, and further wherein each of the at least one apertures includes a vertical dimension which is substantially greater than the diameter of the axle, thereby enabling the axle to travel upward and downward within the aperture.

5. The vehicle of claim 4, wherein for each of the at least one apertures, the axle includes a bearing with a head portion and a stem portion that extends at least partially through the at least one aperture.

6. The vehicle of claim 1, wherein the free-floating wheel extends rearward of the at least one driven wheel.

7. The vehicle of claim 1, wherein the drive assembly includes an electrically powered motor.

8. The vehicle of claim 1, wherein for each of the at least one driven wheel, the frame includes an exhaust pipe-shaped region that is configured as a housing that covers the corresponding at least one driven wheel.

9. The vehicle of claim 1, wherein the vehicle further includes a steering mechanism adapted to enable a user to steer the first wheel.

10. A children's ride-on vehicle, comprising:
    a drive assembly including a battery assembly and a motor assembly in communication with the battery assembly;
    a steerable wheel coupled to a steering mechanism that is adapted to enable a user to steer the vehicle;
    plural drive wheels in communication with the drive assembly and adapted to be rotatably driven by the drive assembly; and
    a vehicle body in the form of a motorcycle and including regions adapted to represent an engine, foot boards, a gas tank and exhaust pipes, wherein the exhaust pipe regions of the vehicle body are configured as housings which cover the drive wheels.

11. The vehicle of claim 10, wherein the vehicle further includes a rear wheel rotatably coupled to the body and extending rearward of the drive wheels.

12. The vehicle of claim 11, wherein the steerable and rear wheels have larger diameters than the drive wheels.

13. The vehicle of claim 11, wherein the rear wheel is slidably mounted within a vertical range of positions with respect to the body.

14. The vehicle of claim 13, wherein the rear wheel is free from internal bias within the vertical range of positions.

15. The vehicle of claim 14, wherein the rear wheel is coupled to the vehicle by a pair of mounts, each mount including a race defining the vertical range of positions within which the rear wheel may travel as external forces are imparted to the wheel.

16. The vehicle of claim 13, wherein the vertical range of positions includes an upper and a lower limit that are between approximately one inch and approximately three inches apart from each other.

17. A children's ride-on vehicle, comprising:

a frame;

a steerable front wheel;

plural driven wheels;

a motorized drive assembly adapted to impart a rotational velocity to the driven wheels; and a rear wheel rotatably mounted on an axle, wherein the axle is coupled to the frame and vertically adjustable with respect thereto within a defined range of positions, and further wherein the rear wheel and axle are free from internal bias within the vertical range of positions.

18. The vehicle of claim 17, wherein the rear wheel moves up and down within the defined range of positions.

19. The vehicle of claim 17, wherein the vehicle further comprises a pair of spaced-apart mounts that include elongate apertures through which the axle extends as it travels within the defined range of positions.

20. The vehicle of claim 19, further comprising a pair of bearings through which the axle extends, wherein each bearing includes a stem portion that extends through a respective one of the apertures, and a head portion that is slidable along a respective one of the mounts as the axle travels within the defined range of positions.

21. A children's ride-on vehicle, comprising:

a frame;

a first wheel rotatably mounted on the frame;

a drive assembly;

at least one driven wheel coupled to the drive assembly; and a non-loadbearing wheel coupled to the frame and rotatable about an axle, wherein the frame includes a track within which the axle travels, and further wherein the track defines upper and lower limits within which the non-loadbearing wheel travels as external forces are imparted to the non-loadbearing wheel.

22. The vehicle of claim 21, wherein the non-loadbearing wheel is slidably coupled to the frame and adapted to travel within a vertical range of positions as external forces are imparted to the wheel.

23. The vehicle of claim 22, wherein the non-loadbearing wheel is free from internal bias within the vertical range of positions.

24. The vehicle of claim 21, wherein the non-loadbearing wheel is rotatably mounted on an axle, wherein the track includes at least one aperture through which the axle extends, and further wherein each of the at least one apertures includes a vertical dimension which is substantially greater than the diameter of the axle, thereby enabling the axle to travel upward and downward within the aperture.

25. The vehicle of claim 21, wherein for each of the at least one driven wheel, the frame includes an exhaust pipe-shaped region that is configured as a housing that covers the corresponding at least one driven wheel.

26. The vehicle of claim 1, wherein the vehicle further includes a steering mechanism adapted to enable a user to steer the first wheel.

* * * * *

UNITED STATES PATENT AND TRADEMARK OFFICE
CERTIFICATE OF CORRECTION

PATENT NO.     : 6,120,345
DATED          : September 19, 2000
INVENTOR(S)    : Gary G. Lenihan, John L. Jones, Jr. and Karl D. Lerch It is certified that error appears in the above-identified patent and that said Letters Patent is hereby corrected as shown below:

<u>Column 6,</u>
Lines 4-5, after "lower limits within which the" please delete "first wheel" and insert -- free-floating wheel -- therefor.
Lines 5-6, after "forces are imparted to the" please delete "first wheel" and insert -- free-floating wheel -- therefor.

Signed and Sealed this

Fifth Day of July, 2005

JON W. DUDAS
*Director of the United States Patent and Trademark Office*